Feb. 6, 1951     J. R. DUNBAR ET AL     2,540,077
HIGH-PRESSURE GLAND
Filed Aug. 4, 1947
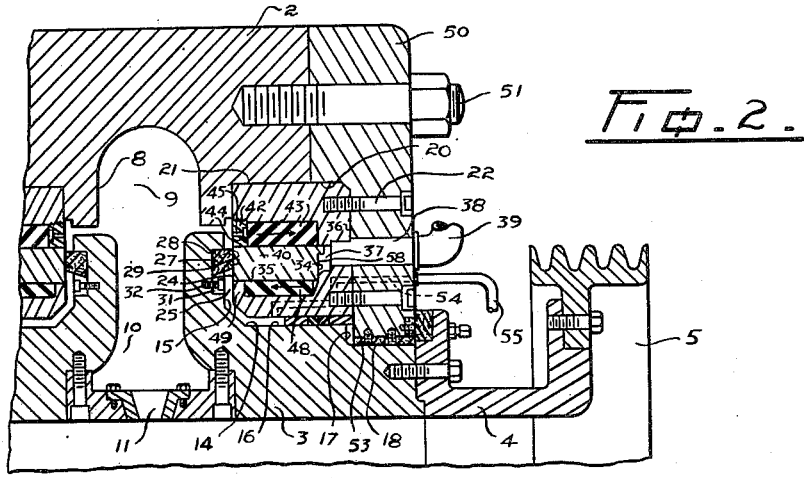
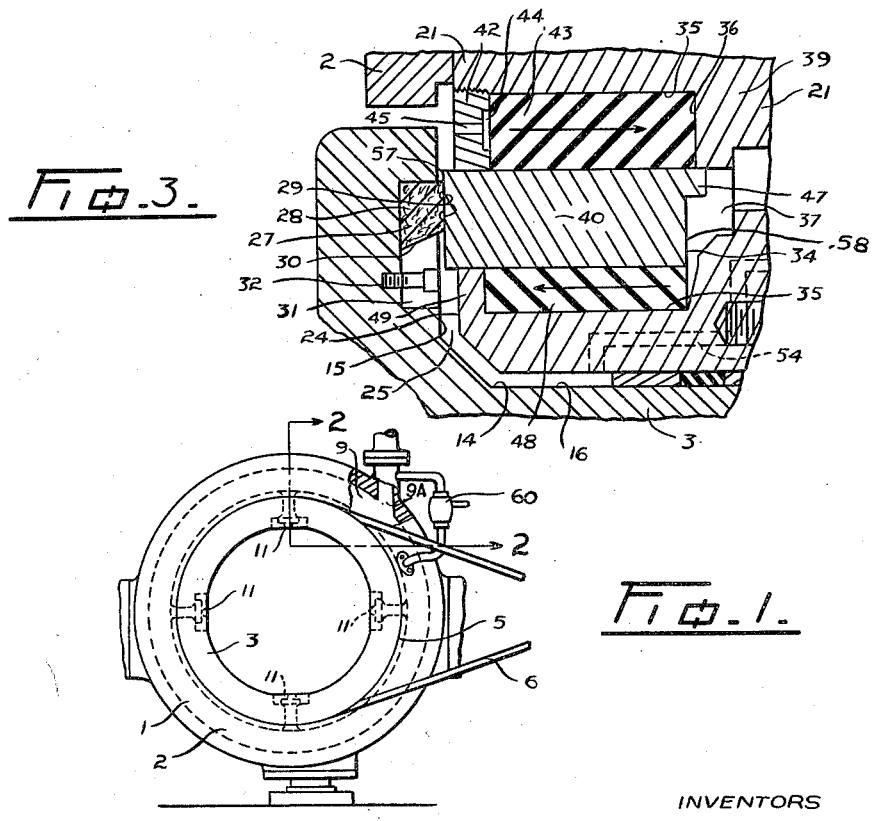
INVENTORS
JAMES ROBERT DUNBAR
PRENTICE BLOEDEL
HOWARD ALLAN SIMONS
*Ernest E. Carver*
ATTORNEY Patented Feb. 6, 1951

2,540,077

UNITED STATES PATENT OFFICE 2,540,077

HIGH-PRESSURE GLAND

James Robert Dunbar, Prentice Bloedel, and Howard Allan Simons, Vancouver, British Columbia, Canada, assignors to Bloedel, Stewart & Welch Ltd., Vancouver, British Columbia, Canada Application August 4, 1947, Serial No. 765,950

1 Claim. (Cl. 286—9)

Our invention relates to improvements in high pressure glands for relatively rotating parts.

Serious difficulty has been experienced in designing a gland about a rotating part of a high pressure centrifugal pump or other hydraulic machinery which will not be subject to heavy wear of the packing or metal parts and which will prevent leakage of any appreciable nature.

The invention as herein described is applied between the rotor and stator of a log barker and is adapted to operate under an internal water pressure of twelve hundred pounds to the square inch or more. Since in the machine referred to it is desirable to use water lubricated bearings, it is desirable that some slight water flow shall take place past the gland to reach said water lubricated bearings, but that said leak should be of such low magnitude that the water loss past the gland shall not effect the normal efficiency of the machine.

The present invention contemplates a gland in which one of the sealing members is in a floating position and pressure is applied to one side of said sealing member to substantially balance the working pressure of the hydraulic fluid within the machine, as will be more fully described in the following specification and shown in the accompanying drawings, in which:

Fig. 1 is a front elevational view of a hydraulic barking machine to which the gland is fitted.

Fig. 2 is an enlarged sectional view of a portion of the stator and rotor and is taken on the line 2—2 of Figure 1.

Fig. 3 is an enlarged detail view of the gland per se.

In the drawings like characters of reference indicate corresponding parts in each figure.

The numeral 1 indicates a rotary log barking machine having a stator 2 in which an annular rotor 3 is mounted for rotation. An annular flange 4 is extended from each end of the rotor and supports a pulley 5 which is connected by belts 6 to a suitable source of power, not shown. The inner annulus 8 of the stator is provided with a circumferential groove or fluid passage 9 into which water is supplied from an inlet 9A at high pressure of between 1000 and 1800 pounds per square inch and will vary according to the nature of the work to be done by the log barker. The rotor 3 is provided with a plurality of ducts 10 which are provided with water jets 11 on their inner periphery, through which water is adapted to discharge to accomplish the work.

Annular rebates 14 are formed at opposite ends of the rotor 3, each having a flange face 15 and a peripheral face 16. A second rebate 17 is formed at each end of the peripheral face 16 to form a pair of stub sleeves 18 upon which the rotor 3 is adapted to rotate. A rebate 20 is formed in the inner periphery at each end of the stator 2 and an annular ring 21 is secured therein by a row of bolts 22. The inner face 24 of the ring 21 is spaced from the flange face 15 of the rotor to define a space 25 which is sealed by a gland generally indicated by the numeral 27.

The flange 15 is recessed to receive an annular gasket 28 having a spiral lubrication groove 29 on its bearing face. The gasket is tapered on its inner periphery as at 30 and is held within its recess by a ring 31 secured in adjusted position by a row of cap screws 32. The gasket 28 is obviously required to withstand a heavy shear strain by virtue of the pressure of water passing through the machine and must in such circumstances be capable of responding to lubrication by water or other non-viscous liquids and in the present instance I use a laminated fabric bonded in synthetic resin as a preferred material. The annular ring 21 which may be formed integrally with the stator is provided with an annular groove or gasket pocket 34 having peripheral walls 35 and a base 36. The base 36 is provided with an annular groove 37 which communicates through a duct 38 and a connection 39, see Figure 2, to a source of water under pressure.

A cylindrical plunger 40 is mounted for endwise movement in the gasket pocket 34 with its inner end moving in the annular groove 37 and is spaced from the outer peripheral wall of the pocket 34 by a ring 42 secured to the ring 21 and a tightly fitting sealing band of rubber 43. The outer or free end of the plunger is adapted to engage the gasket 28. A shallow water groove 44 is formed on the outer side of the ring 42 and a row of water passages 45 connect said groove with the circumferential groove 9 of the stator, so that the working pressure within said groove is constantly applied to the inner end of the rubber sealing band 43 to force it against the base 36 of the pocket, against the outer periphery of the plunger 40 and against the outer peripheral wall 35 of said pocket. The rubber sealing band is not secured by any adhesive or fastening means to the surfaces against which it contacts and it is therefore capable of being displaced in the general direction indicated by the arrow towards the base 36 to maintain a perfect seal between the groove 9 and the annular base groove 37.

The rear inner end of the plunger 40 is provided with a rearwardly extending rim 47 which extends into the annular base groove 37 to keep the rubber band 43 from extruding into said groove as the plunger advances due to wear of the face of the gasket 28. Between the inner periphery of the pocket 34 and the inner periphery of the plunger 40 is a second sealing band 48 which is retained therebetween by an integral flange 49 extending inwardly to the plunger wall. The inner end of the band 48 and the inner end of the plunger are at all times under thrust from the water entering the groove 37 and the pocket 34 through the duct 38, consequently any displacement of the rubber of said band 48 will be in the direction of the arrow shown thereon. The band 48 is also free from any adhesive bond with the parts it contacts.

A flange 50 is secured by studs 51 at each end of the stator, one only shown, and covers its adjacent ring 21. The inner periphery of said flange is lined with suitable bearing strips 53 to provide a bearing in which the stub sleeve 18 of the rotor 3 is journalled. These bearing strips are of a water lubricating type in the instant machine and between them water passages 54 extend from the interspaces between said strips through the flange 50 to a discharge 55.

The internal area of the plunger 40 indicated by the numeral 57 which is exposed to the working pressure within the circumferential groove 9 of the stator is considerably less than the area 58 of the back of the plunger and the rubber band 48, so that by applying substantially equal pressures over said areas leakage between the gasket 28 and the plunger 40 is prevented, but by suitably reducing the pressure applied through the duct 37, a leak is provided of sufficient magnitude as to allow for proper lubrication between said gasket and said plunger 40.

It will be readily understood that rubber however well made possesses air filled or other interstices and that it is quite impossible to fit rubber into a space so exactly as to prevent some air pockets, consequently when appropriate endwise pressure is applied by the controlled pressure through the duct 37, a portion of each of the bands 43 and 48 will be displaced in the direction as shown in Figure 3 and the contact between the peripheral faces of the rubber band are brought into such intimate contact with their adjacent metal faces, so that no leakage will take place between the duct 9 and the duct 37. If the rubber bands 43 and 48 are cemented to their adjoining surfaces, the band surfaces are prevented from endwise slippage along the contacting surfaces and the pressure causes a cleavage of the rubber substantially parallel to the axis of the stator.

The water under pressure which is supplied to the duct 9 is also connected to the back of the plunger through the fitting 39, consequently the thrust on the plunger 40 from the cylinder will exceed the resisting thrust of the pressure within the machine. A reduction valve 60 or any other suitable control device will be connected between the duct 9 or other part of the supply line to the machine, so that just sufficient differential pressure is applied to the gland to stop or suitably restrain leakage between the gasket and said plunger, so as to reduce the wear to a desired minimum.

We claim:

A high pressure gland for relatively rotating parts of a hydraulic machine having a rotating flange and a stationary flange, a gasket carried by one of the flanges, and an annular groove or cylinder in the other flange, said cylinder having a plunger having its outer end face adapted to engage the gasket and a rear end face adapted to be urged outwardly of its cylinder by fluid pressure, means for admitting fluid under pressure to both end faces of the plunger, said annular groove having an outer peripheral wall and a base, said base being disposed within the length of the plunger and in engagement therewith, a sealing band housed within the interspace bounded by the outer peripheral wall of the groove, the base and the outer peripheral wall of the plunger, a ring secured to the outer periphery of the annular groove extending into contact with the outer periphery of the plunger adjacent its outer end and being in contact with an end of the sealing band, said ring being grooved to define an annular space surrounding an end of the band, said ring having an orifice for the admission of fluid under pressure to said annular space and a portion of the adjacent end face of said sealing band.

JAMES ROBERT DUNBAR.
PRENTICE BLOEDEL.
HOWARD ALLAN SIMONS.

REFERENCES CITED

The following references are of record in the file of this patent:

UNITED STATES PATENTS

| Number | Name | Date |
| --- | --- | --- |
| 1,122,051 | Wohlenberg | Dec. 22, 1914 |
| 1,369,380 | Bogdanoff | Feb. 22, 1921 |
| 1,511,481 | Koelker | Oct. 14, 1924 |
| 1,910,811 | Peterson | May 23, 1933 |
| 1,927,543 | Doyle | Sept. 19, 1933 |
| 2,021,346 | Allen | Nov. 19, 1935 |

FOREIGN PATENTS

| Number | Country | Date |
| --- | --- | --- |
| 409,600 | Great Britain | of 1934 |